Jan. 26, 1965   T. KALETA   3,167,623
LIQUID LEVEL SWITCH WITH NORMALLY CLOSED CONTACTS
AND AUXILIARY MEANS TO MAINTAIN CONTACTS
IN ENGAGED POSITION
Filed Aug. 15, 1962   2 Sheets-Sheet 1

INVENTOR
*THEODORE KALETA*
BY
ATTORNEY

United States Patent Office 3,167,623
Patented Jan. 26, 1965

3,167,623
LIQUID LEVEL SWITCH WITH NORMALLY CLOSED CONTACTS AND AUXILIARY MEANS TO MAINTAIN CONTACTS IN ENGAGED POSITION
Theodore Kaleta, 275 Albemarle St., Rahway, N.J.
Filed Aug. 15, 1962, Ser. No. 217,029
3 Claims. (Cl. 200—84)

My invention relates generally to electrical switches and specifically to a liquid level detector switch for mounting on a tank employing a pair of opposed, movable magnets adapted to mechanically actuate a pair of electrical contacts thereby energizing and de-energizing an electrical circuit, the circuit being electrically insulated from the tank and the contacts being enclosed in a vapor-proof, hermetically sealed chamber.

It is desirable to prevent a tank containing liquid from becoming empty as, for instance, in the case of the common fuel oil tank containing domestic heating oil and the like. If the tank is sufficiently empty to expose the outlet pipe to the burner, air will enter therein and the pump will require priming. In addition, the bottom of the tank is invariably filled with sediment which can clog or damage the fuel lines, the pump, the injection nozzle and the ignition electrodes. Devices are known which may be mounted in the filler neck of the tank and will indicate on a gauge the level of the fluid therein or the volume remaining. However, such devices require someone to read the gauge which is undesirable. A more desirable mechanism is one which will automatically either actuate a warning system or shut down the discharge of liquid from the tank when the level thereof reaches a predetermined minimum. A number of liquid level detector switches have been devised which employ generally a float mechanism immersed in the liquid in the tank connected to an electrical switch and adapted to engage and disengage the switch with the rise and fall of liquid in the tank. However, in these known devices, the tank has been made part of the electrical circuit for the switch or employed as a common ground. In addition, the switch contacts are exposed to vapors from the liquid in the tank. In the case of gasoline or volatile fuel oils, this is entirely unsatisfactory by reason of the obvious fire and explosion hazard.

Therefore, it is among the objects and advantages of my invention to provide a liquid level detector switch having a pair of opposed, engageable electrical contacts adapted to energize and de-energize an electrical circuit enclosed within a vapor-proof, hermetically sealed chamber.

Another object of my invention is to provide a liquid level detector switch in which a pair of normally closed electrical contacts will open to circuit when the fluid in the tank falls below a predetermined level thereby de-energizing an operating circuit.

A further object of my invention is to provide a liquid level detector switch in which the disengagement of electrical contacts mounted therein will de-energize an operating circuit powering a pump removing liquid from the tank or, in the alternative, energize a circuit to sound a bell, flash a light or actuate some other warning mechanism.

Yet another object of my invention is to provide a liquid level detector switch in which a pair of opposed, engageable electrical contacts are normally maintained in engagement by mechanical action induced by the magnetic attraction between a pair of opposed, movable magnets.

Still another object of my invention is to provide a liquid level detector switch in which the tank upon which the switch is mounted is electrically insulated from the switch and the electrical circuit controlled by the switch.

A further object of my invention is to provide a liquid level detector switch in which a pair of opposed, engageable electrical contacts may be manually engaged from without the tank.

Yet a further object of my invention is to provide a liquid level detector switch which may be threadably engaged to the intake neck of a common fuel tank.

These objects and advantages as well as other objects and advantages may be achieved by my invention, one embodiment of which is illustrated in the drawings in which.

Figure 1:
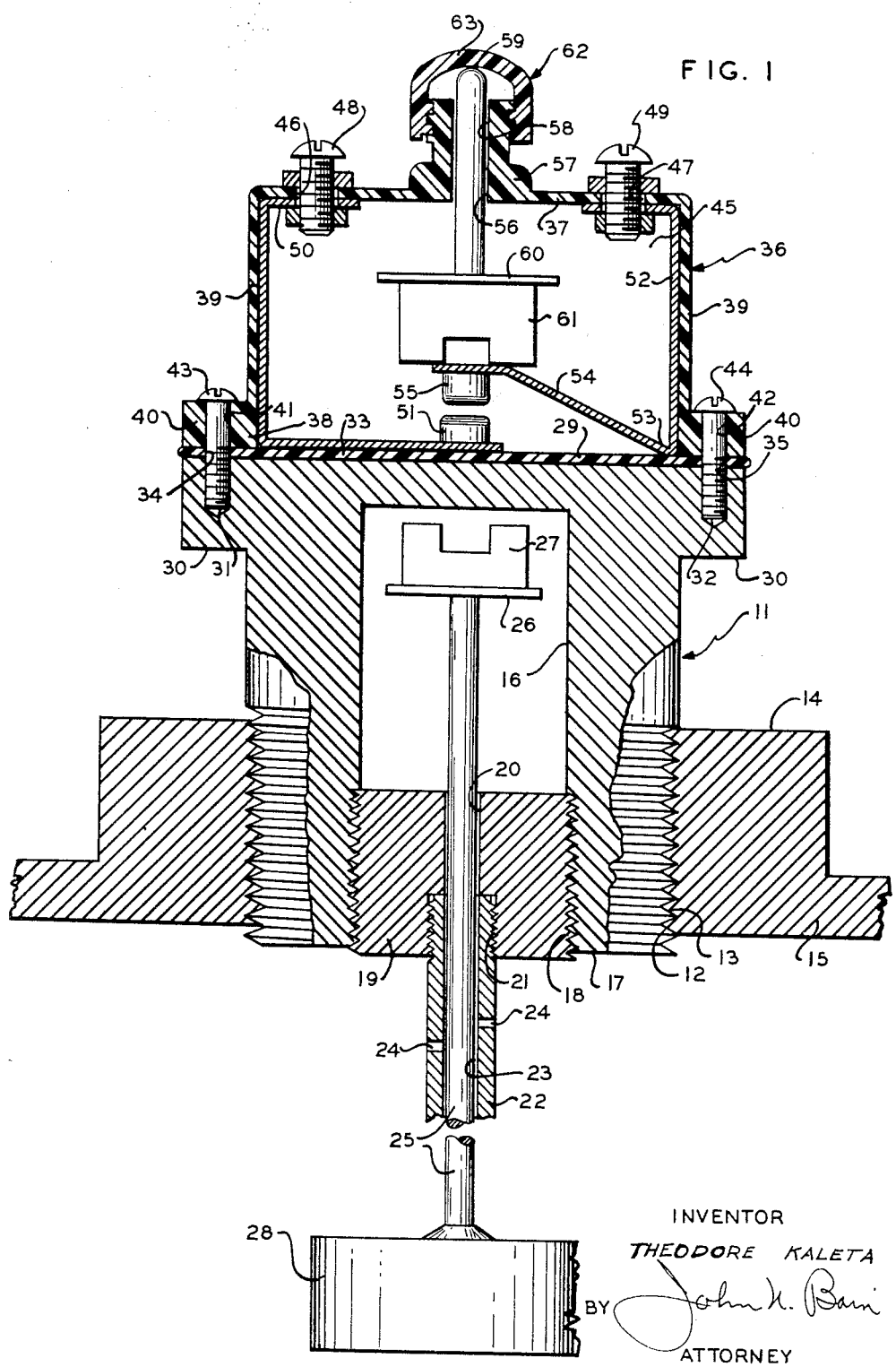
FIGURE 1 is a side elevational, partial cross-sectional view of my liquid level detector switch assembled for operation.
Figure 2:
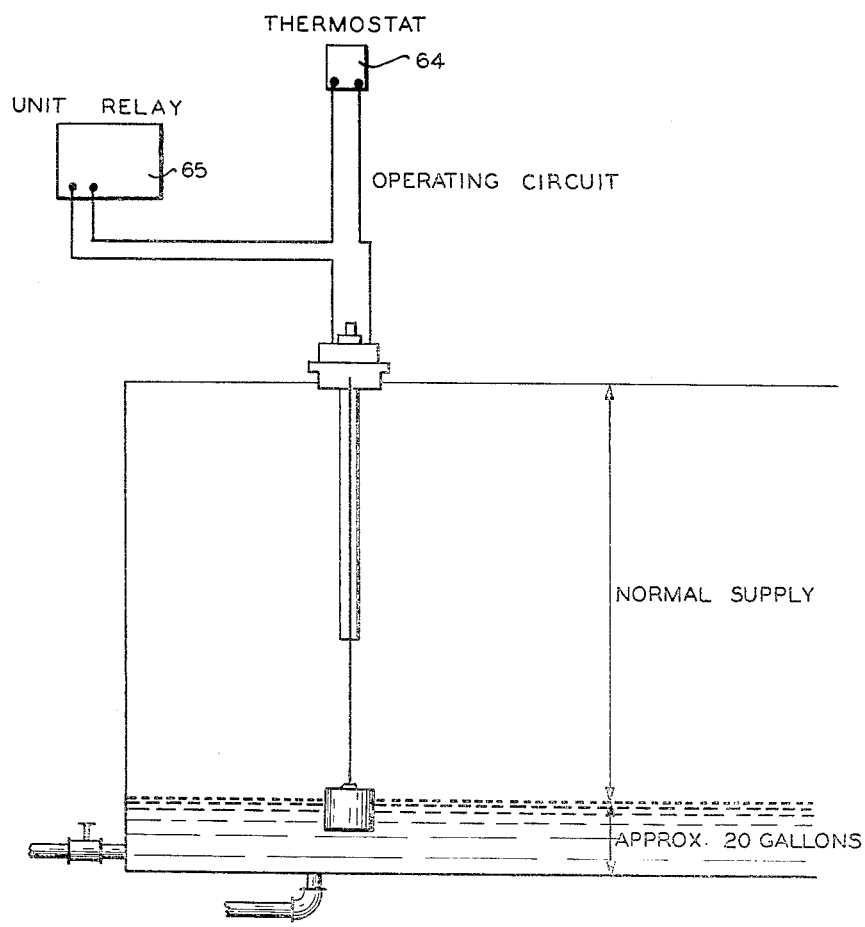
FIGURE 2 is a schematic view showing my liquid level detector switch mounted on a fuel tank and engaged to an electrical operating circuit.

Referring now to the drawings in detail, my invention comprises a non-magnetic, cylindrical body 11 having threads 12 at one end thereof. The threads 12 are adapted to cooperatively engage threads 13 on the intake pipe 14 of a common fuel tank 15.

The body 11 is provided with an axial, blind bore 16 communicating with its bottom 17. The bore 16 is provided with internal threads 18 adjacent to the bottom 17 of the body 11.

A threaded bushing 19 is threadably engaged within the blind bore 16. The bushing 19 is provided with an axial bore 20 extending therethrough having an internally threaded recess 21 adjacent to the bottom 17 of the body 11, the major pitched diameter of the threads of which are greater than the diameter of the bore 20.

An elongated, non-magnetic guide tube 22 externally threaded at one end and having an axial bore 23 extending therethrough is threadably engaged to the recess 21 in the bushing 19. The guide tube 22 is provided with a plurality of radial openings 24 adapted to admit fuel oil into the bore 23 as a lubricant.

An elongated, operating rod 25 longer than tube 24 is slidably engaged within the bore 23 therein. The operating rod 25 is fabricated of some non-magnetic material. One end of the rod 25 extends upwardly through the bore 20 in the bushing 19 which communicates with the bore 23 in the tube 22 into the blind bore 16 above the bushing 19. The end of the rod 25 above the bushing 19 is provided with a disc 26, generally perpendicular to the axis of the rod 25 fabricated of some non-magnetic material. A magnet 27 is attached to the disc 26 opposite the rod 25. The opposite end of the rod 25 is threadably engaged to a float 28.

The body 11 is provided with a flat top face 29 opposite the threads 12. The face 29 is provided with an annular flange 30 having a pair of opposed, threaded blind bores 31, 32. A dielectric, non-magnetic insulating disc 33 is mounted over the top face 29 and annular flange 30 of the body 11 and is provided with appropriate holes 34, 35 which coincide with the threaded blind bores 31 and 32 respectively.

An electrically non-conducting and non-magnetic cover 36 is mounted above the disc 33. The cover 36, which for convenience is shown to be generally cylindrical but which may be rectangular, is closed at its top 37 and opened at its bottom 38 communicating with the insulating disc 33. The side wall 39 of the cover 36 is provided with an integral annular flange 40 adjacent to its open bottom 38. The annular flange 40 is provided with a pair of bores 41 and 42 positioned coaxially with the threaded blind bores 31 and 32 respectively on the flange 30 of the body 11 and adapted to receive mounting screws 43 and 44. The cover 36 is preferably fabricated of plastic as is the insulating disc 33 and a hermetic seal may be provided therebetween by means of an appropriate sealing medium such as glue, resin or the like. Thus, there is defined a hermetically sealed chamber 45 within the cover 36.

The top 37 of the cover 36 is provided with a pair of openings 46 and 47 adjacent to the side wall 39. Electrical terminals 48 and 49 are mounted in the openings 46 and 47 respectively and are adapted to connect to an operating circuit external to the chamber 45. The terminals 48 and 49 are hermetically sealed in the openings 46 and 47.

The end of terminal 48 within the chamber 45 is electrically connected to an electrically conductive strip 50 which extends radially outwardly to the side wall 38 and from thence downwardly and thence radially inwardly to and terminating at the central axis of the cover 36. An upstanding electrical contact 51 is electrically connected to the end of the strip 50 and is generally coaxial with the axis of the cover 36 and the body 11. A second electrically conductive strip 52 is electrically connected to terminal 49 within the chamber 45 extending radially outwardly to the side wall 39 and from thence downwardly to the disc 33. At the disc 33 the strip 52 is provided with an angular bend 53 defining a radially inwardly and obliquely upwardly disposed electrically conductive spring 54 terminating at the axis of the cover 36. The angle of inclination of the spring 54 is approximately ten degrees above the plane of the disc 33. The bottom of the spring 54 is provided with a downwardly extending electrical contact 55 electrically connected thereto and generally coaxial with the cover 36 and opposed to and normally displaced away from the contact 51.

The top 37 of the cover 36 is provided with a central, axial opening 56. Formed integrally on the top 37 of the cover 36 and coaxially therewith is an upstanding, externally threaded guide 57. The guide 57 is provided with an axial bore 58 generally coaxial with the axis of the cover 36, the contacts 51 and 55, the body 11, the magnet 27 and the operating rod 25. A non-magnetic shaft 59 is slidably mounted within the bore 58 in the guide 57 and extends downwardly through the top 37 of the cover 36 into the chamber 45. The end of the shaft 59 within the chamber 45 is provided with a disc 60 generally perpendicular to the axis of the shaft 59. Mounted on the disc 60 opposite the shaft 59 is a magnet 61 which is generally coaxial with the shaft 59 and the cover 36. The opposite end of the shaft 59 extends above the top of the guide 57. An internally threaded cap 62 is threadably engaged to the guide 57 and forms a vapor-proof seal for the bore 58.

The body 11, the guide tube 22 and the shaft 59 may be conveniently fabricated of aluminum. The insulating disc 33 and the cover 36 together with the integral upstanding guide 57 may be conveniently fabricated of some tough and durable plastic which is resistant to deterioration from vapors of the liquid contained in the tank. The conductive strips 50 and 52 may be fabricated of copper or any other suitable electrically conductive material as may be the terminals 48 and 49.

My switch may be assembled by screwing the guide tube 22 into the threaded recess 21 on the bore 20 of the bushing 19. The operating rod is detached from the float 28 and passed downwardly through the bore 20 in the bushing 19 and into the bore 23 in the guide tube 22, leaving the disc 26 and magnet 27 previously mounted thereon above the bushing 19. The float 28 may then be threadably engaged to the opposite end of the rod 19. The thread bushing 19 may then be threaded to the blind bore 16 in the body 11 with the float 28 projecting downwardly and the magnet 27 projecting upwardly toward the blind end of the bore 16.

The terminals 48 and 49 together with the electrically conductive strips 50 and 52 and the contacts 51 and 55 are preferably premounted within the cover 36. The magnet 61, attached to the disc 60 and shaft 59 is also premounted with the shaft 59 extending upwardly through the bore 58. The cover 36 may then be fastened to the body 11 by means of the mounting screws 43 and 44. The internally threaded cap 62 is engaged to the guide 57.

In operation, the body 11 is threadably engaged within the intake pipe 14 of the tank 15 with the float 28 extending downwardly into the fluid contained therein. When submerged, the natural buoyancy of the float 28 will cause the rod 19 to rise upwardly in the guide tube 22 until the magnet 27 engages the blind end of the bore 16 in the body 11. The magnets 27 and 61 are chosen so that their magnetic attraction for each other together with the weight of the magnet 61, the disc 60 and the shaft 59 are sufficient to bend the spring 54 downwardly until the movable contact 55 engages the stationary contact 51. This closes the electrical circuit between the terminals 48 and 49 within the hermetically sealed chamber 45.

As the level of the fluid within the tank falls, the float 28 will rise to the surface. The length of the rod 25 is dimensioned to cause the float 28 to rise to the surface of the fluid in the tank when the tank reaches a predetermined level. Thereafter, a further decrease in the level of the fluid within the tank will cause the rod 25 to slide downwardly in the bore 20 of the bushing 19 and the bore 23 of the guide tube 22 withdrawing the magnet 27 downwardly away from the top of the blind bore 16 in the body 11. As the magnet 27 withdraws downwardly, the intensity of the magnet field between it and the magnet 61 within the sealed chamber 45 decreases. When the intensity of the magnet field has decreased sufficiently, the normal upward urging of the spring 54 will lift the magnet 61 upwardly causing the shaft 59 to slide upwardly in the bore 58. Thus, the electrical contacts 51 and 55 will be disengaged and the circuit within the chamber 45 opened.

Of course, it is desirable to manually re-engage the contacts 51 and 55 so that the warning mechanism may be shut off or the pump withdrawing fuel from the tank re-energized. This may be easily accomplished by screwing the cap 62 downwardly on the guide 57 until its top 63 engages the end of the shaft 59 manually forcing the shaft downwardly in the bore 58 so that the magnet 61 engages and bends the spring 54 downwardly until contact 55 engages contact 51.

When contacts 51 and 55 are engaged, the operating circuit is energized. When contacts 51 and 55 are disengaged, the operating circuit to thermostat 64 and relay 65 is de-energized and the pump powered thereby rendered inoperable. Moreover, the relay 65 may be adapted to energize a warning signal such as a light or a bell.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:
1. A liquid level detector switch comprising,
 (a) a body member adapted for mounting on the top of a tank, the body member having a blind bore,
 (b) a vertically movable first shaft mounted to the body extending into the blind bore,
 (c) a magnet on the first shaft within the blind bore,
 (d) a float on the opposite end of the first shaft,
 (e) a cover mounted on the body defining a hermetically sealed chamber,
 (f) a vertically movable second shaft mounted on the cover extending into the chamber and beyond the cover,

(g) a magnet on the end of the second shaft in the chamber, (h) a stationary contact mounted in the chamber, (i) a resilient spring mounted in the chamber extending between the magnet on the second shaft and the stationary contact, (j) a contact on the spring in generally vertical alignment with a stationary contact, the spring normally urging the contact apart, (k) the magnets attracting each other with a force sufficient to overcome the spring thereby engaging the contacts only when the magnets are within a predetermined distance from each other, (l) means to engage the second shaft from without the chamber moving the said second shaft downwardly to cause engagement of the contacts, (m) means for retaining the second shaft in a descended position to maintain engagement of the contacts, and (n) means for electrically connecting the said contacts to a circuit external to the chamber.

2. A liquid level detector switch comprising,
(a) the structure in accordance with claim 1, in which
(b) the body and cover are fabricated of non-magnetic material.

3. A liquid level detector switch comprising,
(a) the structure in accordance with claim 1 and,
(b) an externally threaded guide on the cover external to the chamber having a transverse bore therein, the second shaft being slidably mounted in the bore and extending both into the chamber and beyond the guide, and
(c) a cap threadably engaged to the guide adapted to engage the end of the second shaft forcing it downwardly to cause the magnet on the opposite end thereof to engage the movable contact and close the circuit.

References Cited by the Examiner
UNITED STATES PATENTS

| | | | |
|---|---|---|---|
| 2,236,360 | 3/41 | Beam | 200—84.3 |
| 2,495,149 | 1/50 | Taylor | 200—84.3 X |
| 2,899,517 | 8/59 | Hastings et al. | 200—84.3 |
| 2,927,175 | 3/60 | Booth et al. | 200—84.3 |
| 2,929,901 | 3/60 | Bloch | 200—153.19 X |

BERNARD A. GILHEANY, *Primary Examiner.*